C. BILLMEYER.
Car-Couplings.

No. 158,892.   Patented Jan. 19, 1875.

WITNESSES:
W. W. Hollingsworth,
Golon C. Kemon

INVENTOR:
Chas. Billmeyer
BY
ATTORNEYS.

UNITED STATES PATENT OFFICE.

CHARLES BILLMEYER, OF YORK, PENNSYLVANIA.

IMPROVEMENT IN CAR-COUPLINGS.

Specification forming part of Letters Patent No. 158,892, dated January 19, 1875; application filed November 4, 1874.

CASE A.

*To all whom it may concern:*

Be it known that I, CHARLES BILLMEYER, of the city and county of York and State of Pennsylvania, have invented a new and Improved Draw-Bar and Buffer; and I do hereby declare that the following is a full, clear, and exact description of the same, reference being had to the accompanying drawing, forming a part of this specification, in which—

Figure 1:
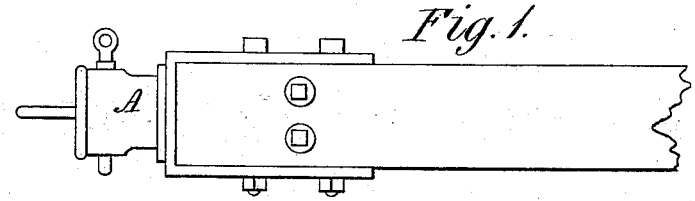
Figure 2:
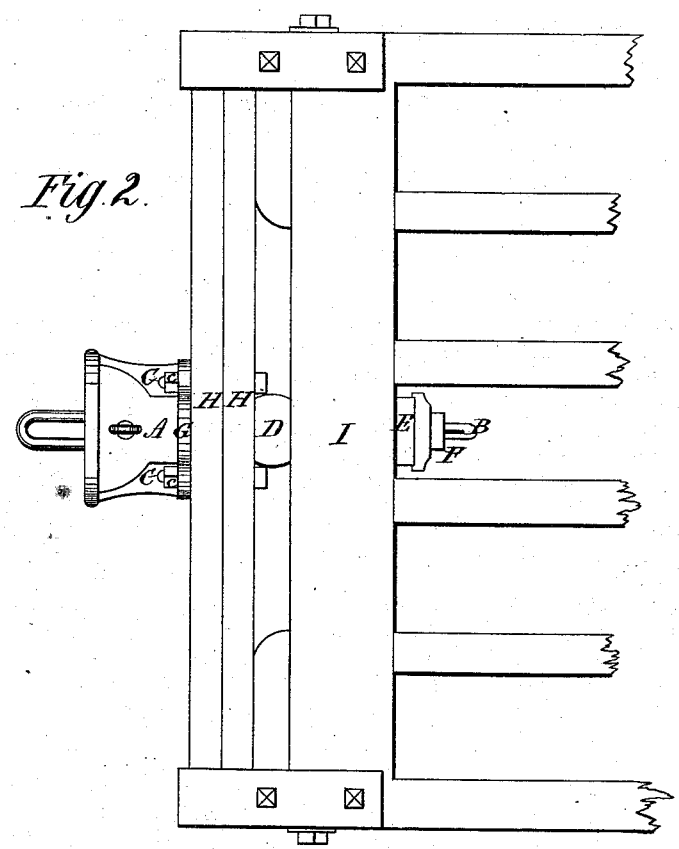
Figure 3:
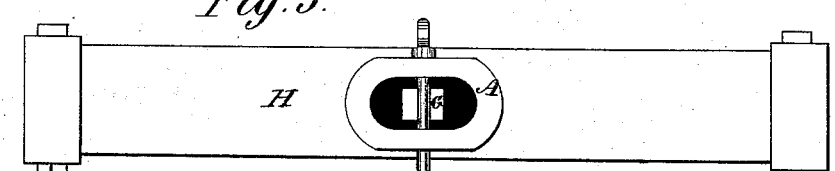

Figure 1 is a side view. Fig. 2 is a top view. Fig. 3 is an end view.

The invention relates to and consists in novel means for re-enforcing and sustaining the ordinary transverse springs to which the draw-heads of a car are attached, all as hereinafter fully described, and pointed out in the claim.

A represents the car draw-head, which is attached, by bolts and nuts C c, to the usual spring H H. First, I relieve the great and continuous strain to which this spring H is liable in the forward draft by a re-enforcing rubber or other spring, E, which is placed behind and firmly held against the cross-beam I by a nut, F, and screw-bolt B, the head of the latter being placed inside the draw-head, and bearing against the rear plate G. The spring H and the spring E must receive the strain simultaneously, and thus relieve each other according to their relative tension or resisting power. The spring H is thus made much more durable and retentive of its normal tension. Second, I prevent any injury to spring H from the concussive or striking force which occurs when two draw-heads are brought suddenly together by a median spring, D, arranged behind the spring H and in front of the beam I. Through this spring the bolt B may pass, and thus retain it more exactly in position.

It will be observed that one great advantage incidental to these improvements is that a central draft is thereby obtained which is otherwise impracticable.

Having thus described my invention, what I claim as new is—

The combination of bolt and nut B F and the three springs H D E with the beam I, all substantially as and for the purpose specified.

CHARLES BILLMEYER.

Witnesses:
    A. W. SHETTER,
    GEORGE M. SHETTER.